(12) United States Patent  
Gunderson

(10) Patent No.: US 12,502,099 B2  
(45) Date of Patent: Dec. 23, 2025

(54) DETECTION OF CHANGES IN PATIENT HEALTH BASED ON PEAK AND NON-PEAK PATIENT ACTIVITY DATA

(71) Applicant: Medtronic, Inc., Minneapolis, MN (US)

(72) Inventor: Bruce D. Gunderson, Plymouth, MN (US)

(73) Assignee: Medtronic, Inc., Minneapolis, MN (US)

( * ) Notice: Subject to any disclaimer, the term of this patent is extended or adjusted under 35 U.S.C. 154(b) by 668 days.

(21) Appl. No.: 17/014,843

(22) Filed: Sep. 8, 2020

(65) Prior Publication Data

US 2022/0071513 A1  Mar. 10, 2022

(51) Int. Cl.
| | |
|---|---|
| *A61B 5/11* | (2006.01) |
| *A61B 5/00* | (2006.01) |
| *A61M 60/148* | (2021.01) |
| *A61N 1/362* | (2006.01) |
| *A61N 1/39* | (2006.01) |

(52) U.S. Cl.
CPC .......... *A61B 5/1118* (2013.01); *A61B 5/6801* (2013.01); *A61B 5/686* (2013.01); *A61B 5/742* (2013.01); *A61M 60/148* (2021.01); *A61N 1/362* (2013.01); *A61N 1/39* (2013.01); *A61B 2562/0219* (2013.01); *A61M 2205/502* (2013.01)

(58) Field of Classification Search
CPC ..... A61B 5/1118; A61B 5/6801; A61B 5/686; A61B 5/742; A61B 2562/0219; A61M 60/148; A61M 2205/502; A61N 1/362; A61N 1/39

See application file for complete search history.

(56) References Cited

U.S. PATENT DOCUMENTS

| 6,102,874 A | 8/2000 | Stone et al. |
| 6,821,258 B2 | 11/2004 | Reed et al. |

(Continued)

FOREIGN PATENT DOCUMENTS

| CN | 103959293 A | 7/2014 |
| CN | 107077523 A | 8/2017 |

(Continued)

OTHER PUBLICATIONS

Machine Translation of JP 2004121562, Patent Translate, pp. 1-40, printed on Nov. 15, 2022 (Year: 2004).*

(Continued)

*Primary Examiner* — Jennifer Robertson  
*Assistant Examiner* — Om Patel  
(74) *Attorney, Agent, or Firm* — Shumaker & Sieffert, P.A.

(57) ABSTRACT

This disclosure is directed to systems and techniques for detecting change in patient health based upon peak and non-peak patient activity data. In some examples, the peak and non-peak patient activity data correspond to one or more peak (time) periods and the one or more non-peak periods, respectively, where at least one peak period and at least one non-peak period corresponds a highest activity level and a lowest activity level, respectively, for a single day. If a change in patient health is detected, the techniques described herein may direct a medical device to generate for display output indicating the detection of the change in patient health.

16 Claims, 7 Drawing Sheets

(56) References Cited

U.S. PATENT DOCUMENTS

| | | |
|---|---|---|
| 7,177,684 B1 | 2/2007 | Kroll et al. |
| 8,998,830 B2 | 4/2015 | Halperin et al. |
| 9,226,706 B2 | 1/2016 | Jehara et al. |
| 10,136,859 B2 | 11/2018 | Cutaia |
| 10,206,591 B2 | 2/2019 | Osorio et al. |
| 10,271,791 B2 | 4/2019 | Donnelly et al. |
| 10,335,595 B2 | 7/2019 | Ferree et al. |
| 10,426,380 B2 | 10/2019 | Schindhelm et al. |
| 10,905,359 B2 | 2/2021 | Barretto et al. |
| 10,973,421 B2 | 4/2021 | Wisloff et al. |
| 2008/0243543 A1 | 10/2008 | Jung et al. |
| 2009/0275811 A1* | 11/2009 | Schatz .............. A61N 1/37 600/302 |
| 2011/0231101 A1 | 9/2011 | Bidargaddi et al. |
| 2014/0337450 A1 | 11/2014 | Choudhary et al. |
| 2015/0065893 A1* | 3/2015 | Ye .............. A61B 5/0205 600/595 |
| 2015/0106052 A1* | 4/2015 | Balakrishnan ....... A61B 5/6823 702/150 |
| 2015/0324541 A1 | 11/2015 | Cheung et al. |
| 2016/0038094 A1 | 2/2016 | An et al. |
| 2016/0058337 A1* | 3/2016 | Blahnik ............. A61B 5/1112 600/595 |
| 2017/0119283 A1* | 5/2017 | Ten Kate ........... A61B 5/7203 |
| 2017/0143262 A1* | 5/2017 | Kurunmäki ......... A61B 5/7264 |
| 2018/0092597 A1 | 4/2018 | Schaevitz et al. |
| 2018/0254096 A1 | 9/2018 | Karaunaithi et al. |
| 2019/0022397 A1 | 1/2019 | Srivastava et al. |
| 2019/0069851 A1 | 3/2019 | Sharma et al. |
| 2019/0167209 A1 | 6/2019 | Annoni et al. |
| 2019/0209022 A1 | 7/2019 | Sobol et al. |
| 2019/0343400 A1 | 11/2019 | Dasgupta |

FOREIGN PATENT DOCUMENTS

| | | |
|---|---|---|
| CN | 107750139 A | 3/2018 |
| EP | 1079733 A1 | 3/2001 |
| EP | 1595574 A1 | 11/2005 |
| JP | 2004121562 * | 4/2004 |
| WO | 9958056 A1 | 11/1999 |
| WO | WO-2010090867 A2 * | 8/2010 .......... A61B 5/0002 |
| WO | 2016110804 A1 | 7/2016 |

OTHER PUBLICATIONS

Lyden et al., "A Comprehensive Evaluation of Commonly Used Accelerometer Energy Expenditure and MET Prediction Equations," European Journal of Applied Physiology, vol. 111, Sep. 15, 2010, pp. 187-201.

Crouter et al., "A Refined 2-Regression Model for the ActiGraph Accelerometer," Medicine and Science in Sports and Exercise, vol. 5, No. 42, May 2010, 1029-1037.

Boateng, "ActivityAware: Wearable System for Real-Time Physical Activity Monitoring among the Elderly," Dartmouth Computer Science Technical Report TR2017-824, May 15 2017, 79 pp.

Matson, Introducing Anamoly Detection in Datadog, Datadog, Oct. 27, 2016, 5 pp.

Walch et al., "Sleep Stage Prediction with Raw Acceleration and Photoplethysmography Heart Rate Data Derived from a Consumer Wearable Device," Sleep, vol. 42, No. 12, Aug. 2019, 19 pp.

Cheung et al., "Validation of Minute-to-Minute Scoring for Sleep and Wake Periods in a Consumer Wearable Device Compared to an Actigraphy Device," Sleep Science and Practice, vol. 2, No. 11, Sep. 2, 2018, 7 pp.

Edgcomb et al., "Estimating Daily Energy Expenditure from Video for Assistive Monitoring," 2013 IEEE International Conference on Healthcare Informatics, Sep. 9, 2013, pp. 184-191.

International Search Report and Written Opinion of International Application No. PCT/US2021/049456, dated Jan. 5, 2022, 12 pp.

International Preliminary Report on Patentability from International Application No. PCT/US2021/049456 dated Mar. 23, 2023, 9 pp.

First Office Action and Search Report, and translation thereof, from counterpart Chinese Application No. 202180054925.2 dated Aug. 13, 2025, 19 pp.

\* cited by examiner

DETECTION OF CHANGES IN PATIENT HEALTH BASED ON PEAK AND NON-PEAK PATIENT ACTIVITY DATA

FIELD

The disclosure relates generally to medical systems and, more particularly, medical systems configured to monitor patient activity for changes in patient health.

BACKGROUND

Some types of medical systems may monitor various data (e.g., a cardiac electrogram (EGM) and activity) of a patient or a group of patients to detect changes in health. In some examples, the medical system may monitor the cardiac EGM to detect one or more types of arrhythmia, such as bradycardia, tachycardia, fibrillation, or asystole (e.g., caused by sinus pause or AV block). In some examples, the medical system may include one or more of an implantable medical device or a wearable device to collect various measurements used to detect changes in patient health.

SUMMARY

Medical systems and techniques as described herein detect changes in health for a patient based upon patient activity (e.g., level of body movement) during peak and non-peak time periods (e.g., daily peak and non-peak time periods). In general, there is a well-defined relationship between a patient's daily activities and that patient's overall physical health. As demonstrated herein, peak and non-peak time periods (e.g., in a twenty-four hour day) for the patient's activities (e.g., aggregated over a number of days) correlate with an accurate assessment of the patient's health and monitoring those time periods may provide an improved indication of changes in the patient's health.

A variety of medical devices (e.g., implantable devices, wearable devices, etc.) may be configured to monitor patient activity and detect changes in the patient's health that correlate to changes in data recording the patient's activity each day over a number of days. The patient's peak and non-peak time periods provide highly accurate data for computing an abstraction to represent the recorded patient activity data (e.g., a daily activity metric value). The techniques described herein include performing a detection analysis to detect changes in patient health by comparing the patient's daily activity metric values over at least two days. Such a comparison not only simplifies the detection analysis in general, leveraging the peak and non-peak time periods for the daily activity metric values accomplishes complementary goals of lowering operational resource requirements and lowering overall resource utilization. Both conserve resource capacities, saving time and capital. Having a lower resource footprint enables smaller and less complex embodiments of these techniques (e.g., wearable). A medical device equipped with substantial resource capacities is no longer needed; instead, a medical device with fewer capacities of processing, network, and storage resources can be configured to detect changes in patient health in accordance with any technique described herein.

Furthermore, by identifying a patient's individual peak and non-peak periods, the techniques described herein take into account that patient's unique behavior in the analysis of the patient's health. No two people share exactly the same behavior and for that reason, one patient's peak and non-peak time periods are often unique and provide highly accurate data for that patient only. It also is true that most people cannot maintain a fixed daily schedule and often change their peak and non-peak activity periods. Techniques as described herein that may identify different peak and non-peak periods from day-to-day, for example, may further improve upon the detection analysis described herein. Differences between patients' daily habits may be neutralized by identifying each patient's peak and non-peak periods. Therefore, having medical systems focus on peak and non-peak time periods mitigates or eliminates altogether the problems associated with other approaches, such as a tendency for false positives and false negatives. In view of the above, the present disclosure describes a technological improvement or a technical solution that is integrated into a practical application.

In one example, a medical system comprises one or more sensors configured to sense patient activity; sensing circuitry configured to provide patient activity data based on the sensed patient activity; and processing circuitry configured to: for each of a plurality of days: determine an activity level for each of a plurality of periods during the day based on the activity data; determine one or more peak periods and one or more non-peak periods from the plurality of periods based on the activity levels, the one or more peak periods and the one or more non-peak periods corresponding to one or more highest activity levels and one or more lowest activity levels, respectively; and determine a daily value for one or more activity metrics from the patient activity data corresponding to each of the one or more peak periods and the one or more non-peak periods, wherein the processing circuitry is further configured to: detect a change in patient health based upon a comparison between the daily values of the one or more activity metrics for at least some of the plurality of days; and generate for display output indicating the detection of the change in patient health.

In another example, a method comprises, for each of a plurality of days: determining an activity level for each of a plurality of periods during the day based on activity data from one or more sensors configured to sense patient activity; determining one or more peak periods and one or more non-peak periods from the plurality of periods based on the activity levels, the one or more peak periods and the one or more non-peak periods corresponding to one or more highest activity levels and one or more lowest activity levels, respectively; and determining a daily value for one or more activity metrics from the patient activity data corresponding to each of the one or more peak periods and the one or more non-peak periods, the method further comprising: detecting a change in patient health based upon a comparison between the daily values of the one or more activity metrics for at least some of the plurality of days; and generating for display output indicating the detection of the change in patient health.

In another example, a non-transitory computer-readable storage medium comprises program instructions that, when executed by processing circuitry of a medical system, cause the processing circuitry to: for each of a plurality of days: determine an activity level for each of a plurality of periods during the day based on the activity data, determine one or more peak periods and one or more non-peak periods from the plurality of periods based on the activity levels, the one or more peak periods and the one or more non-peak periods corresponding to one or more highest activity levels and one or more lowest activity levels, respectively, and determine a daily value for one or more activity metrics from the patient activity data corresponding to each of the one or more peak periods and the one or more non-peak periods; detect a change in patient health based upon a comparison between the daily values of the one or more daily activity metrics for at least some of the plurality of days; and generate for display output indicating the detection of the change in patient health.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF THE DRAWINGS

Like reference characters denote like elements throughout the description and figures.

DETAILED DESCRIPTION

Figure 1:
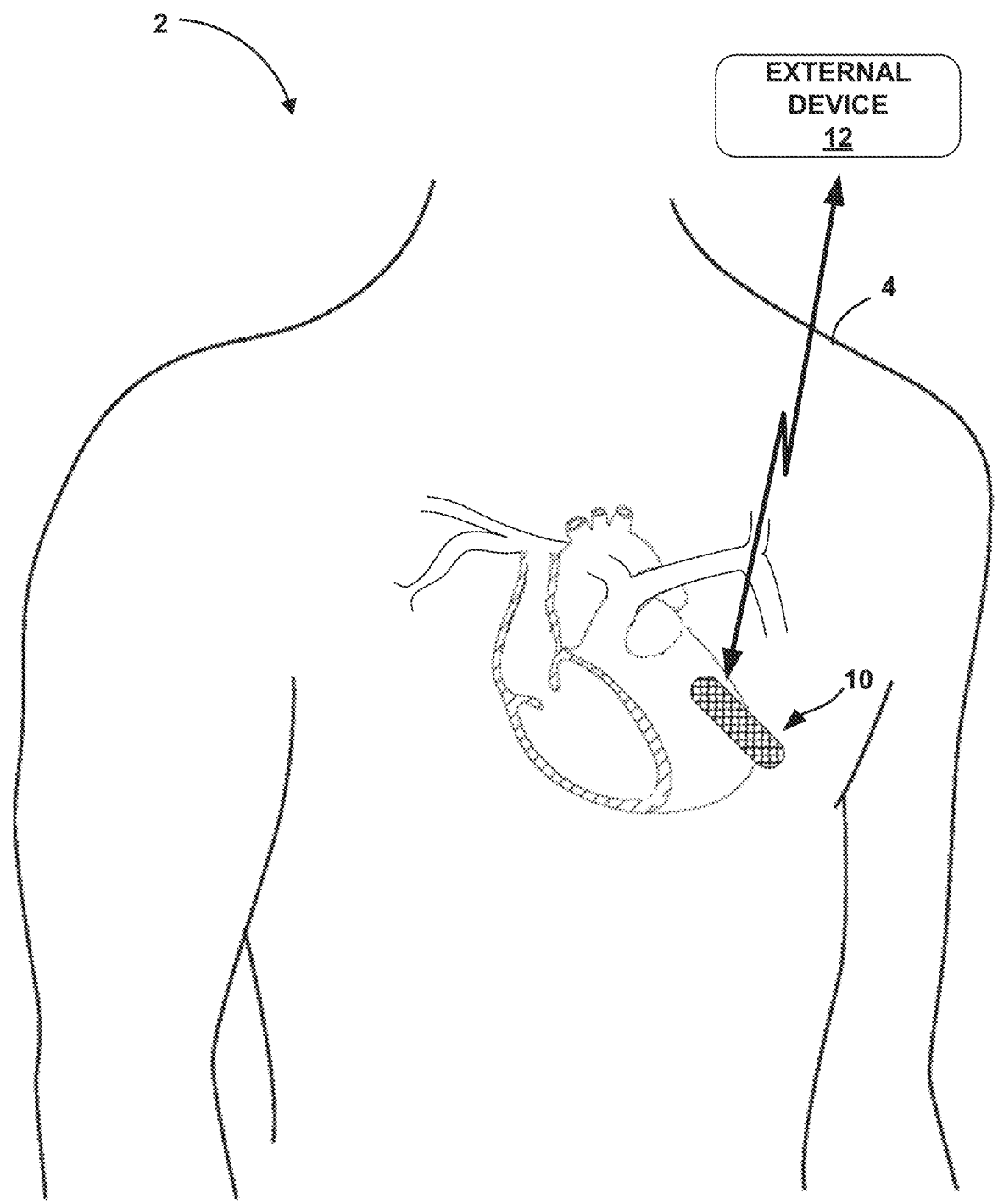
FIG. 1 illustrates example environment of an example medical system in conjunction with a patient, in accordance with one or more examples of the present disclosure.

In general, medical systems according to this disclosure implement techniques for detecting changes in patient health based upon peak and non-peak patient activity data. Daily activity metric values are computed from each of the peak and the non-peak patient activity data and each value represents that patient's activity level for that entire day. Examples of peak and non-peak time periods correspond to a highest activity level and a lowest activity level, respectively, in terms of the patient activity data over a single day. The techniques described herein may detect changes in patient health by comparing (to each other) daily activity metric values determined from patient activity data corresponding to each day's peak (e.g., daytime) periods and non-peak (e.g., nighttime) periods. In one example, if the comparison results indicate a deviation between two daily values or between a daily value and a baseline value that exceeds a threshold, is statistically significant, or otherwise correlates to a decline in patient health, a medical system as described herein generates for display output indicating the decline in patient health. As described herein, identification of a patient's peak and non-peak time periods provide highly accurate data for computing the daily activity metric values and establishing a baseline (e.g., a mean, a median, a maximum, or any other statistical value) from which the changes in patient heath may be detected.

Example medical devices that may collect patient activity data may include an implantable or wearable monitoring device, a pacemaker/defibrillator, or a ventricular assist device (VAD). An implantable or wearable device with an accelerometer continuously measuring the patient activities and recording such measurements as patient activity data is described herein as example medical devices. One example medical device implements a system and technique directed to identifying daily peak and non-peak, e.g., sleep, patient activities for monitoring and trending based on the highest and lowest daily activity levels. One example technique for identifying daily peak and non-peak activity may involve identifying 4 individualized peak time hours and 4 individualized non-peak time hours, the activity data of which are used to monitor and track patient health for a decline.

The example medical device may communicate the patient activity data to other devices, such as a computing device, and those devices may further analyze the patient activity data and then, provide a report regarding the patient's activities and health. The report may compare various implementations of the techniques described herein, for example, comparing, for the same patient, respective daily activity metric values provided by different selections of peak and non-peak time periods. Activity metric values based on activity data during peak and non-peak time periods may provide a patient or caregiver information an important aspect of the patient's health.

In this manner, the techniques of this disclosure may advantageously enable improved accuracy in the detection of changes in patient health and, consequently, better evaluation of the condition of the patient.

FIG. 1 illustrates the environment of an example medical system 2 in conjunction with a patient 4, in accordance with one or more techniques of this disclosure. The example techniques may be used with an IMD 10, which may be in wireless communication with at least one of external device 12 and other devices not pictured in FIG. 1. In some examples, IMD 10 is implanted outside of a thoracic cavity of patient 4 (e.g., subcutaneously in the pectoral location illustrated in FIG. 1). IMD 10 may be positioned near the sternum near or just below the level of the heart of patient 4, e.g., at least partially within the cardiac silhouette. IMD 10 includes a plurality of electrodes (not shown in FIG. 1), and is configured to sense a cardiac EGM via the plurality of electrodes. In some examples, IMD 10 takes the form of the LINQ™ ICM available from Medtronic, Inc. of Minneapolis, MN. IMD 10 includes one or more sensors configured to sense patient activity, e.g., one or more accelerometers.

External device 12 may be a computing device with a display viewable by the user and an interface for receiving user input to external device 12. In some examples, external device 12 may be a notebook computer, tablet computer, workstation, one or more servers, cellular phone, personal digital assistant, or another computing device that may run an application that enables the computing device to interact with IMD 10.

External device 12 is configured to communicate with IMD 10 and, optionally, another computing device (not illustrated in FIG. 1), via wireless communication. External device 12, for example, may communicate via near-field communication technologies (e.g., inductive coupling, NFC or other communication technologies operable at ranges less than 10-20 cm) and far-field communication technologies (e.g., radiofrequency (RF) telemetry according to the 802.11 or Bluetooth® specification sets, or other communication technologies operable at ranges greater than near-field communication technologies).

External device 12 may be used to configure operational parameters for IMD 10. External device 12 may be used to retrieve data from IMD 10. The retrieved data may include values of physiological parameters measured by IMD 10, indications of episodes of arrhythmia or other maladies detected by IMD 10, and physiological signals recorded by IMD 10. For example, external device 12 may retrieve cardiac EGM segments recorded by IMD 10 due to IMD 10 determining that an episode of asystole or another malady occurred during the segment. As another example, external device 12 may receive activity data, daily activity metric values, or other data related to the techniques described herein from IMD 10. As will be discussed in greater detail below with respect to FIG. 5, one or more remote computing devices may interact with IMD 10 in a manner similar to external device 12, e.g., to program IMD 10 and/or retrieve data from IMD 10, via a network.

Processing circuitry of medical system 2, e.g., of IMD 10, external device 12, and/or of one or more other computing devices, may be configured to perform the example techniques for detecting changes in patient health of this disclosure. Processing circuitry of IMD 10 may be communicably coupled to one or more sensors, each being configured to sense patient activity in some form, and sensing circuitry configured to generate patient activity data. Processing circuitry of IMD 10, possibly in combination with processing circuitry of external device 12, may compute daily activity metric values from the patient activity data and after a number of days, analyze the daily values for indicia of patient health including non-trivial changes in patient health. To facilitate a successful analysis, the processing circuitry may identify peak and non-peak periods during the day to be used in the computation of the daily values.

Although described in the context of examples in which IMD 10 senses patient activity, example systems including one or more implantable, wearable, or external devices of any type configured with one or more sensors to sense patient activity may be configured to implement the techniques of this disclosure. In some examples, processing circuitry in a wearable device may execute same or similar logic as the logic executed by processing circuitry of IMD 10 and/or other processing circuitry as described herein. In this manner, a wearable device or other device may perform some or all of the techniques described herein in the same manner described herein with respect to IMD 10. In some examples, the wearable device operates with IMD 10 and/or external device 12 as potential providers of computing/storage resources and sensors for monitoring patient activity and other patient parameters. For example, the wearable device may communicate the patient activity data to external device 12 for storage in non-volatile memory and for computing daily activity metric values from peak patient activity data and non-peak patient activity data. Similar to processing circuitry of IMD 10, processing circuitry of external device 12 may analyze the patient activity data to determine which peak and non-peak periods to use in computing the daily activity metric values.

Figure 2:
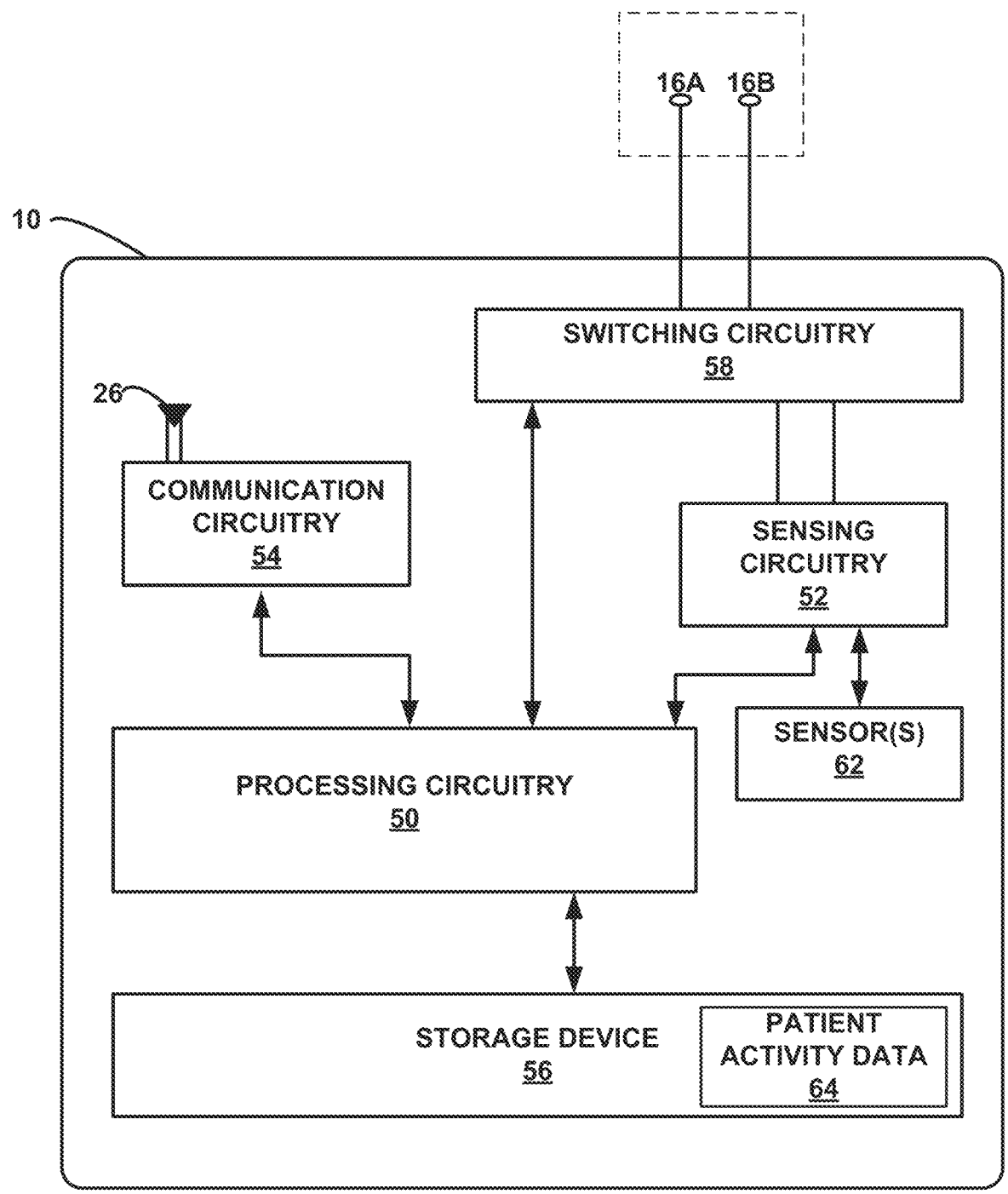
FIG. 2 is a functional block diagram illustrating an example configuration of a medical device, in accordance with one or more examples of the present disclosure.

FIG. 2 is a functional block diagram illustrating an example configuration of IMD 10 of FIG. 1 in accordance with one or more techniques described herein. In the illustrated example, IMD 10 includes electrodes 16A and 16B (collectively "electrodes 16"), antenna 26, processing circuitry 50, sensing circuitry 52, communication circuitry 54, storage device 56, switching circuitry 58, and sensors 62. Although the illustrated example includes two electrodes 16, IMDs including or coupled to more than two electrodes 16 may implement the techniques of this disclosure in some examples.

Processing circuitry 50 may include fixed function circuitry and/or programmable processing circuitry. Processing circuitry 50 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 50 may include multiple components, such as any combination of one or more microprocessors, one or more controllers, one or more DSPs, one or more ASICs, or one or more FPGAs, as well as other discrete or integrated logic circuitry. The functions attributed to processing circuitry 50 herein may be embodied as software, firmware, hardware or any combination thereof.

Sensing circuitry 52 may be selectively coupled to electrodes 16 via switching circuitry 58, e.g., to sense electrical signals of the heart of patient 4. Sensing circuitry 52 may monitor signals from sensors 62, which may include one or more accelerometers, pressure sensors, and/or optical sensors, as examples. In some examples, sensing circuitry 52 may include one or more filters and amplifiers for filtering and amplifying signals received from electrodes 16 and/or sensors 62. Sensing circuitry 52 may capture signals from any one of sensors 62, e.g., to produce patient activity data 64, in order to facilitate monitoring the patient activity and detecting changes in patient health.

Sensing circuitry 52 may generate patient activity data 64 from sensor signals received from sensor(s) 62 that encode the patient activity. Sensing circuitry 52 and processing circuitry 50 may store the patient activity data 64 in storage device 56.

Processing circuitry 50, executing logic configured to perform a detection analysis on the patient activity data 64, is operative to detect any change (e.g., a decline) in patient health. Processing circuitry 50 may control one or more of sensors 62 to sense patient activity in some form; examples of one or more sensors 62 to sense patient activity include an accelerometer (e.g., a three-axis accelerometer), a gyroscope, a temperature gauge, a moment transducer, and/or the like. There are a number of methods for converting the patient activity data into activity levels, which may be a quality (e.g., high activity, low activity, and/or the like) or a quantity (e.g., a number of activity minutes or fractional activity minutes (e.g., 10-second blocks). Activity levels enable differentiation between multiple time periods of patient activity data (e.g., two or more consecutive time periods, two or more contiguous time periods, and/or the like).

One example peak period may be an hour corresponding to a highest activity level in a 24-hour day, and an example non-peak period may be an hour corresponding to a lowest activity level in the same 24-hour day. Another example peak period includes the hour corresponding to the highest activity level in a 24-hour day in addition to one or more of a second, third, fourth, and so on highest activity level hours in a 24-hour day. A complementary non-peak period may include the hour corresponding to the lowest activity level in addition to one or more of a second, third, fourth, and so on hours corresponding to a second, third, fourth, and so on lowest activity levels in the same 24-hour day. The first, second, third, fourth, and so on peak and non-peak periods provide the best evidence of the magnitude of the patient's activity in the context of a day and its impact on overall patient health.

In this example, processing circuitry 50 is configured to determine an activity level for each hour in a day by counting activity minutes using 10sec23 method or a similar algorithm. In general, the 10sec23 method checks whether integrated counts of a frontal (z-axis) accelerometer reaches a 23-count threshold within each of consecutive 10-second windows referred to as epochs. Processing circuitry 50 stores 24 hours of data associated with 10-second activity epochs where any activity epoch that reaches or exceeds the 23-count threshold counts as a fractional activity minute. Combining multiple activity epochs results in the count of activity minutes; for example, each activity minute may represent sixty-seconds in six (e.g., consecutive) activity epochs in which the 23-count threshold was satisfied. When processing circuitry 50 stores 24 hours of activity minutes in a memory buffer in storage device 56, each hour corresponds to a stored data entry indicating how many minutes during that hour included six activity epochs in which the 23-count threshold was satisfied. These minutes may include six consecutive or non-consecutive 10-second epochs. Processing circuitry 50 sorts the buffer from highest to lowest to identify a peak period as the hour having a highest number of activity minutes and a non-peak period as the hour having a lowest number of activity minutes. In this manner, IMD 10 or any other medical device implementing techniques for identifying a patient's peak and non-peak periods may do so regardless of whether the patient is in a patient group or an individual. When IMD 10 is used for a plurality of patients in a group experiment, each patient may be attributed with personalized peak and non-peak periods instead their arbitrary and/or static complements in other group experiments (e.g., fixed or pre-defined periods).

The hourly resolution provides the detection analysis performed by IMD 10 an opportunity to differentiate day and night activity without actually knowing which time of day or whether the patient is asleep or awake. One goal of this opportunity is to identify simple daily measurements for night sleep restlessness (which may indicate sleep quality) and/or peak daytime activity. The peak activity would most likely occur during the daytime and give an idea of the patient's best efforts. The daily values will provide the overall activity for trending and long-term analysis. An abrupt increase or decrease in sleep restlessness or an abrupt decrease in daytime activity could indicate an acute change in health.

Once suitable peak period(s) and non-peak period(s) are identified, processing circuitry 50 of IMD 10 may determine daily values for one or more activity metrics from peak and non-peak patient activity data. In one example activity metric, a formula computes an example daily activity metric value from a weighted average that is computed by applying weights to an average number of peak activity minutes from a peak N (e.g., four) hour window and an average number of non-peak activity minutes from a non-peak N (e.g., four) hour window and then, combining the weighted numbers, e.g., determining a difference or ratio of the numbers. The formula may apply one or more parameters/coefficients to the weighted average before completing the daily activity metric value computation. In some examples, processing circuitry may determine multiple daily activity metric values, such as a first daily activity metric value based on an average of the activity minutes for the N peak hour window and a second daily activity metric value based on an average of the activity minutes for the N non-peak hour window.

Processing circuitry 50 of IMD 10 may execute logic programmed with the above example activity metric; while under the control of the executed logic, processing circuitry 50 of IMD 10 applies the formula to a particular day's peak and non-peak patient activity data and computes the daily activity metric value. Processing circuitry 50 of IMD 10 tracks the daily activity metric values over time to detect changes in patient health. In one example, processing circuitry 50 compares two or more days of daily activity metric values to each other and identifies at least one activity value difference worth analyzing for any indication of a change in patient health. Over time, the example daily activity metric values may form a range and that range corresponds to a baseline representing normal patient health. Deviations from the range that are either statistically significant or otherwise noteworthy indicate a change in patient health. If the patient is known to be healthy, processing circuitry 50 of IMD 10 may establish the range as a healthy baseline such that substantial (negative) deviations from the range may indicate a decline a patient health. Substantial or otherwise noteworthy deviations include deviations from the established baseline that violate a policy, exceed a threshold difference, cross a maximum activity value, and/or the like. It is noted that other activity metrics may implement different formulas, etc., and the present disclosure does not limit the application to any one activity metric.

Communication circuitry 54 may include any suitable hardware, firmware, software or any combination thereof for communicating with another device, such as external device 12, another networked computing device, or another IMD or sensor. Under the control of processing circuitry 50, communication circuitry 54 may receive downlink telemetry from, as well as send uplink telemetry to external device 12 or another device with the aid of an internal or external antenna, e.g., antenna 26. In addition, processing circuitry 50 may communicate with a networked computing device via an external device (e.g., external device 12) and a computer network, such as the Medtronic CareLink® Network. Antenna 26 and communication circuitry 54 may be configured to transmit and/or receive signals via inductive coupling, electromagnetic coupling, Near Field Communication (NFC), Radio Frequency (RF) communication, Bluetooth, WiFi, or other proprietary or non-proprietary wireless communication schemes.

In some examples, storage device 56 includes computer-readable instructions that, when executed by processing circuitry 50, cause IMD 10 and processing circuitry 50 to perform various functions attributed to IMD 10 and processing circuitry 50 herein. Storage device 56 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Storage device 56 may store, as examples, programmed values for one or more operational parameters of IMD 10 and/or data collected by IMD 10 for transmission to another device using communication circuitry 54. Data stored by storage device 56 and transmitted by communication circuitry 54 to one or more other devices may include patient activity data for suspected changes in daily activity metric values and/or indications of changes in patient health.

Figure 3:
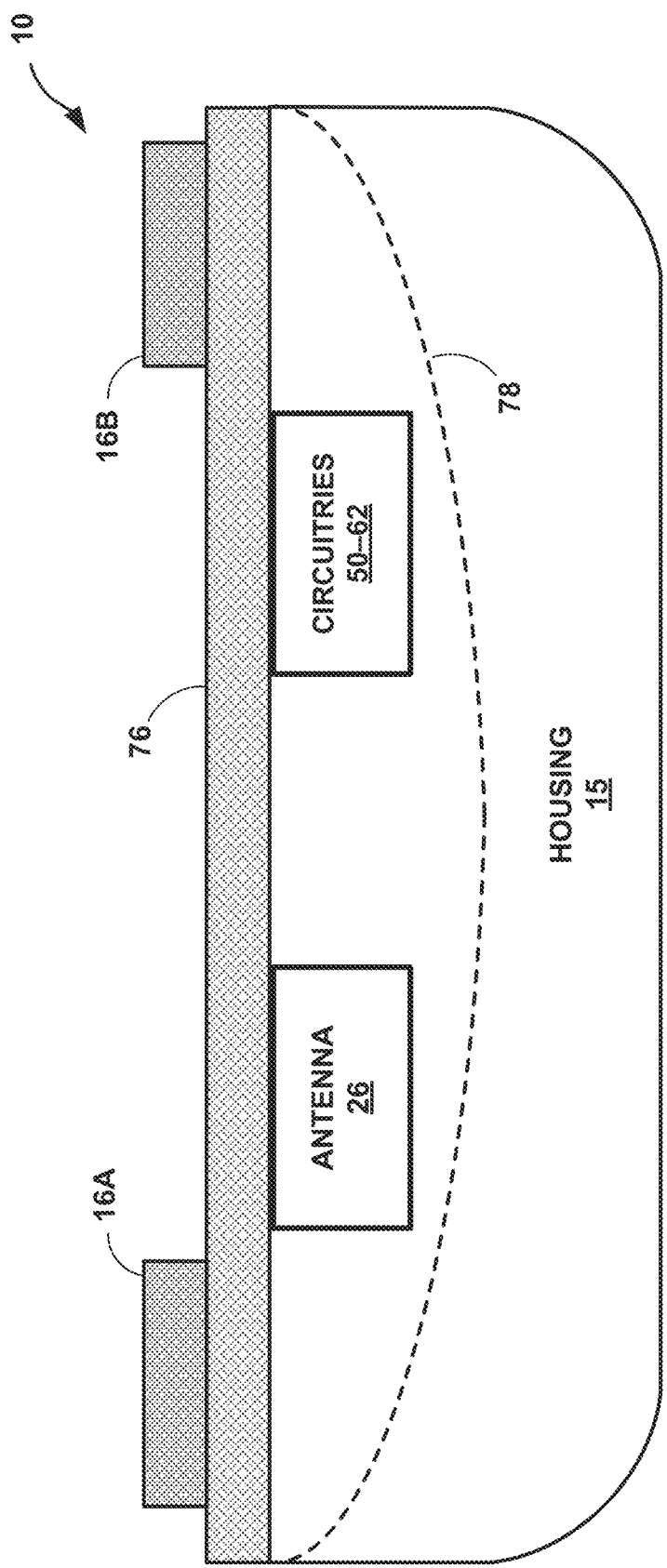
FIG. 3 is a conceptual side-view diagram illustrating an example configuration of the IMD of FIGS. 1 and 2, in accordance with one or more examples of the present disclosure.

FIG. 3 is a conceptual side-view diagram illustrating an example configuration of IMD 10 of FIGS. 1 and 2. While different examples of IMD 10 may include leads, in the example shown in FIG. 3, IMD 10 may include a leadless, subcutaneously-implantable monitoring device having a housing 15 and an insulative cover 76. Electrode 16A and electrode 16B may be formed or placed on an outer surface of cover 76. Circuitries 50-62, described above with respect to FIG. 2, may be formed or placed on an inner surface of cover 76, or within housing 15. In the illustrated example, antenna 26 is formed or placed on the inner surface of cover 76, but may be formed or placed on the outer surface in some examples. In some examples, insulative cover 76 may be positioned over an open housing 15 such that housing 15 and cover 76 enclose antenna 26 and circuitries 50-62, and protect the antenna and circuitries from fluids such as body fluids.

One or more of antenna 26 or circuitries 50-62 may be formed on the inner side of insulative cover 76, such as by using flip-chip technology. Insulative cover 76 may be flipped onto a housing 15. When flipped and placed onto housing 15, the components of IMD 10 formed on the inner side of insulative cover 76 may be positioned in a gap 78 defined by housing 15. Electrodes 16 may be electrically connected to switching circuitry 58 through one or more vias (not shown) formed through insulative cover 76. Insulative cover 76 may be formed of sapphire (i.e., corundum), glass, parylene, and/or any other suitable insulating material. Housing 15 may be formed from titanium or any other suitable material (e.g., a biocompatible material). Electrodes 16 may be formed from any of stainless steel, titanium, platinum, iridium, or alloys thereof. In addition, electrodes 16 may be coated with a material such as titanium nitride or fractal titanium nitride, although other suitable materials and coatings for such electrodes may be used.

Figure 4:
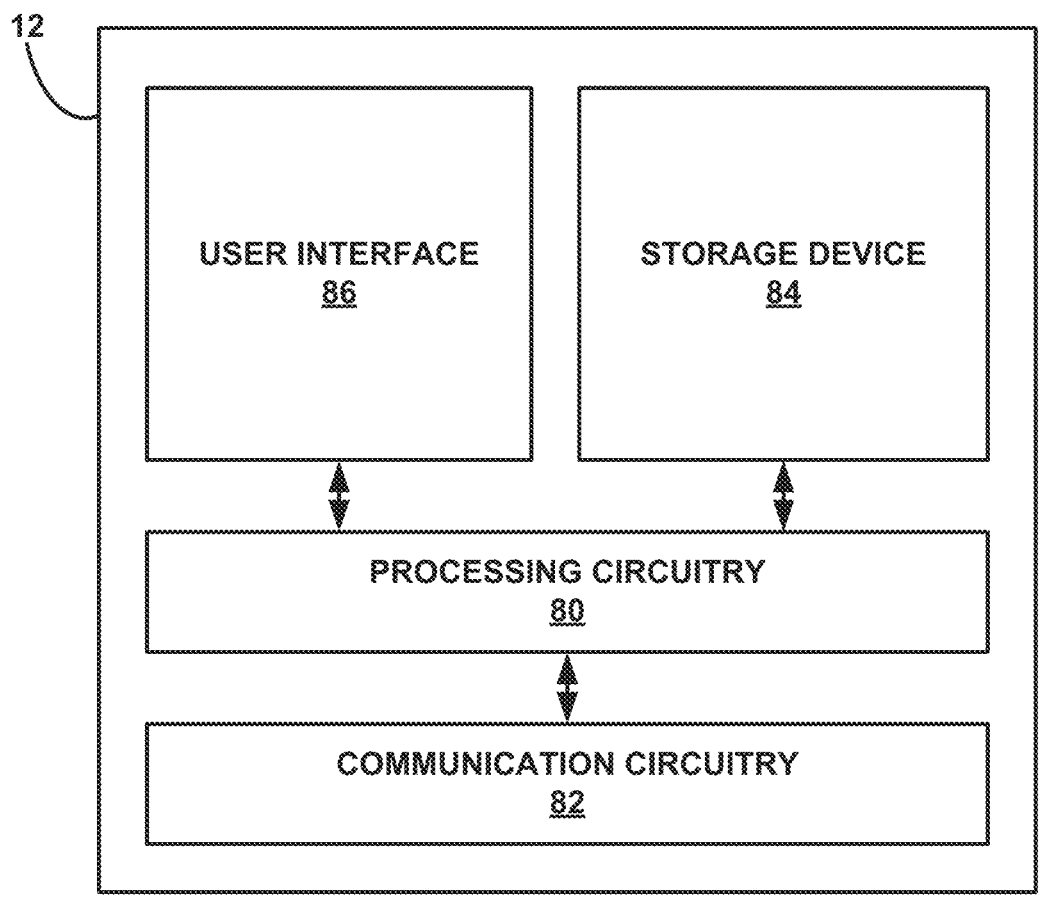
FIG. 4 is a functional block diagram illustrating an example configuration of the external device of FIG. 1, in accordance with one or more examples of the present disclosure.

FIG. 4 is a block diagram illustrating an example configuration of components of external device 12. In the example of FIG. 4, external device 12 includes processing circuitry 80, communication circuitry 82, storage device 84, and user interface 86.

Processing circuitry 80 may include one or more processors that are configured to implement functionality and/or process instructions for execution within external device 12. For example, processing circuitry 80 may be capable of processing instructions stored in storage device 84. Processing circuitry 80 may include, for example, microprocessors, DSPs, ASICs, FPGAs, or equivalent discrete or integrated logic circuitry, or a combination of any of the foregoing devices or circuitry. Accordingly, processing circuitry 80 may include any suitable structure, whether in hardware, software, firmware, or any combination thereof, to perform the functions ascribed herein to processing circuitry 80.

Communication circuitry 82 may include any suitable hardware, firmware, software or any combination thereof for communicating with another device, such as IMD 10. Under the control of processing circuitry 80, communication circuitry 82 may receive downlink telemetry from, as well as send uplink telemetry to, IMD 10, or another device. Communication circuitry 82 may be configured to transmit or receive signals via inductive coupling, electromagnetic coupling, NFC, RF communication, Bluetooth, WiFi, or other proprietary or non-proprietary wireless communication schemes. Communication circuitry 82 may also be configured to communicate with devices other than IMD 10 via any of a variety of forms of wired and/or wireless communication and/or network protocols.

Storage device 84 may be configured to store information within external device 12 during operation. Storage device 84 may include a computer-readable storage medium or computer-readable storage device. In some examples, storage device 84 includes one or more of a short-term memory or a long-term memory. Storage device 84 may include, for example, RAM, DRAM, SRAM, magnetic discs, optical discs, flash memories, or forms of EPROM or EEPROM. In some examples, storage device 84 is used to store data indicative of instructions for execution by processing circuitry 80. Storage device 84 may be used by software or applications running on external device 12 to temporarily store information during program execution.

Data exchanged between external device 12 and IMD 10 may include operational parameters. External device 12 may transmit data including computer readable instructions which, when implemented by IMD 10, may control IMD 10 to change one or more operational parameters and/or export collected data. For example, processing circuitry 80 may transmit an instruction to IMD 10 which requests IMD 10 to export collected data (e.g., asystole episode data) to external device 12. In turn, external device 12 may receive the collected data from IMD 10 and store the collected data in storage device 84. The data external device 12 receives from IMD 10 may include activity data 64. Processing circuitry 80 may implement any of the techniques described herein to analyze a patient's peak and non-peak patient activity data 64 from IMD 10 to determine daily activity metric values e.g., to determine whether the patient is experiencing a change in health.

A user, such as a clinician or patient 4, may interact with external device 12 through user interface 86. User interface 86 includes a display (not shown), such as a liquid crystal display (LCD) or a light emitting diode (LED) display or other type of screen, with which processing circuitry 80 may present information related to IMD 10, e.g., daily activity metric values, indications of changes in daily activity metric values, and indications of changes in patient health that correlated to the changed in daily activity metric values. In addition, user interface 86 may include an input mechanism configured to receive input from the user. The input mechanisms may include, for example, any one or more of buttons, a keypad (e.g., an alphanumeric keypad), a peripheral pointing device, a touch screen, or another input mechanism that allows the user to navigate through user interfaces presented by processing circuitry 80 of external device 12 and provide input. In other examples, user interface 86 also includes audio circuitry for providing audible notifications, instructions or other sounds to the user, receiving voice commands from the user, or both.

Figure 5:
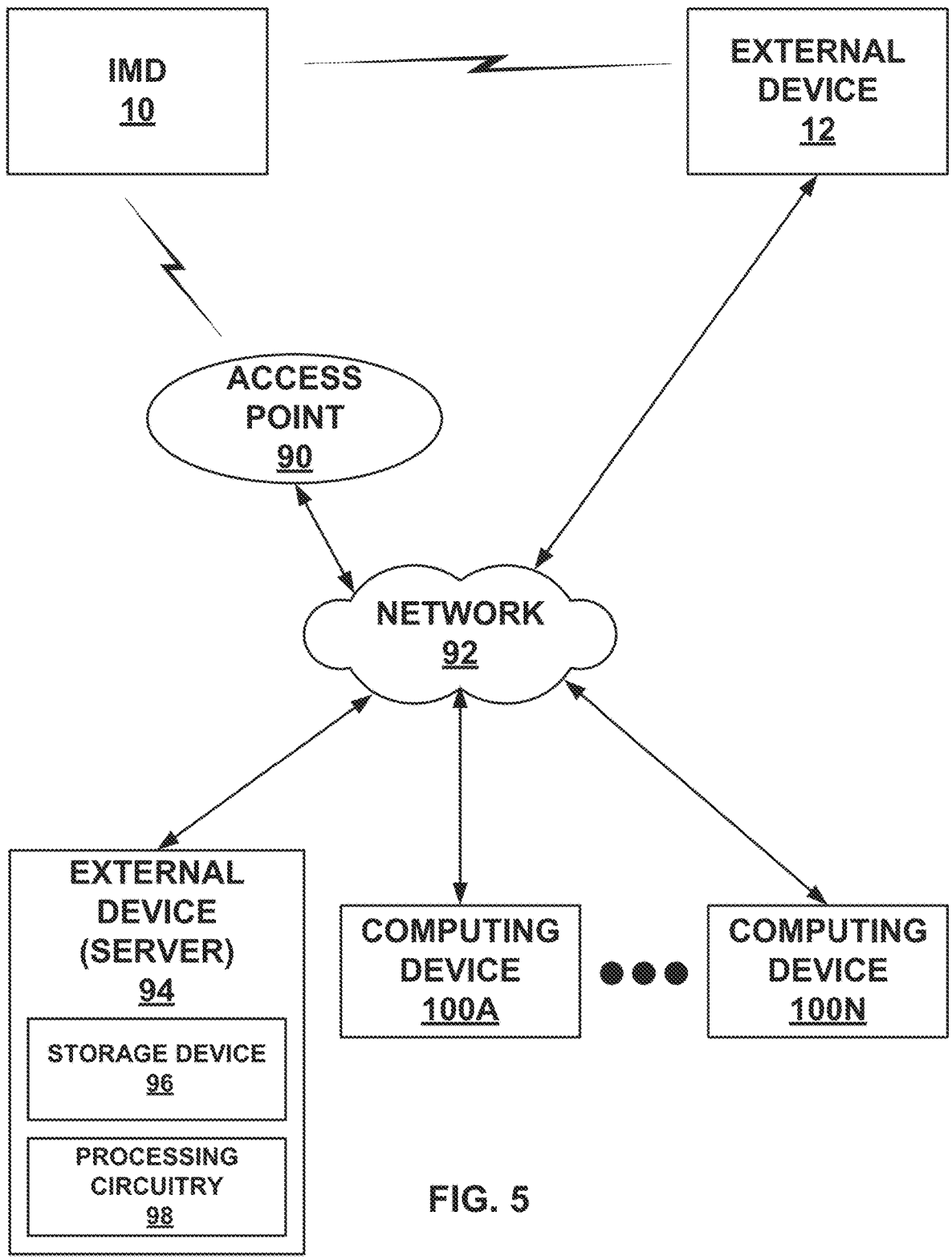
FIG. 5 is a block diagram illustrating an example system that includes an access point, a network, external computing devices, such as a server, and one or more other computing devices, which may be coupled to the medical device and external device of FIGS. 1-4, in accordance with one or more examples of the present disclosure.

FIG. 5 is a block diagram illustrating an example system that includes an access point 90, a network 92, external computing devices, such as a server 94, and one or more other computing devices 100A-100N (collectively, "computing devices 100"), which may be coupled to IMD 10 and external device 12 via network 92, in accordance with one or more techniques described herein. In this example, IMD 10 may use communication circuitry 54 to communicate with external device 12 via a first wireless connection, and to communicate with an access point 90 via a second wireless connection. In the example of FIG. 5, access point 90, external device 12, server 94, and computing devices 100 are interconnected and may communicate with each other through network 92.

Access point 90 may include a device that connects to network 92 via any of a variety of connections, such as telephone dial-up, digital subscriber line (DSL), or cable modem connections. In other examples, access point 90 may be coupled to network 92 through different forms of connections, including wired or wireless connections. In some examples, access point 90 may be a user device, such as a tablet or smartphone, that may be co-located with the patient. IMD 10 may be configured to transmit data, such as a patient's activity data 64, peak and non-peak patient activity data 64, indications of daily activity metric values, and/or indications of changes in patient health, to access point 90. Access point 90 may then communicate the retrieved data to server 94 via network 92.

In some cases, server 94 may be configured to provide a secure storage site for data that has been collected from IMD 10 and/or external device 12. In some cases, server 94 may assemble data in web pages or other documents for viewing by trained professionals, such as clinicians, via computing devices 100. One or more aspects of the illustrated system of FIG. 5 may be implemented with general network technology and functionality, which may be similar to that provided by the Medtronic CareLink® Network.

In some examples, one or more of computing devices 100 may be a tablet or other smart device located with a clinician, by which the clinician may program, receive alerts from, and/or interrogate IMD 10. For example, the clinician may access data and/or indications of patient health collected by IMD 10 through a computing device 100, such as when patient 4 is in in between clinician visits, to check on a status of a medical condition. In some examples, the clinician may enter instructions for a medical intervention for patient 4 into an application executed by computing device 100, such as based on a status of a patient condition determined by IMD 10, external device 12, server 94, or any combination thereof, or based on other patient data known to the clinician. Device 100 then may transmit the instructions for medical intervention to another of computing devices 100 located with patient 4 or a caregiver of patient 4. For example, such instructions for medical intervention may include an instruction to change a drug dosage, timing, or selection, to schedule a visit with the clinician, or to seek medical attention. In further examples, a computing device 100 may generate an alert to patient 4 based on a status of a medical condition of patient 4, which may enable patient 4 proactively to seek medical attention prior to receiving instructions for a medical intervention. In this manner, patient 4 may be empowered to take action, as needed, to address his or her medical status, which may help improve clinical outcomes for patient 4.

In the example illustrated by FIG. 5, server 94 includes a storage device 96, e.g., to store data retrieved from IMD 10, and processing circuitry 98. Although not illustrated in FIG. 5 computing devices 100 may similarly include a storage device and processing circuitry. Processing circuitry 98 may include one or more processors that are configured to implement functionality and/or process instructions for execution within server 94. For example, processing circuitry 98 may be capable of processing instructions stored in storage device 96. Processing circuitry 98 may include, for example, microprocessors, DSPs, ASICs, FPGAs, or equivalent discrete or integrated logic circuitry, or a combination of any of the foregoing devices or circuitry. Accordingly, processing circuitry 98 may include any suitable structure, whether in hardware, software, firmware, or any combination thereof, to perform the functions ascribed herein to processing circuitry 98. Processing circuitry 98 of server 94 and/or the processing circuitry of computing devices 100 may implement any of the techniques described herein to analyze activity data 64 received from IMD 10, e.g., to determine whether the health status of a patient has changed.

Storage device 96 may include a computer-readable storage medium or computer-readable storage device. In some examples, storage device 96 includes one or more of a short-term memory or a long-term memory. Storage device 96 may include, for example, RAM, DRAM, SRAM, magnetic discs, optical discs, flash memories, or forms of EPROM or EEPROM. In some examples, storage device 96 is used to store data indicative of instructions for execution by processing circuitry 98.

Figure 6:
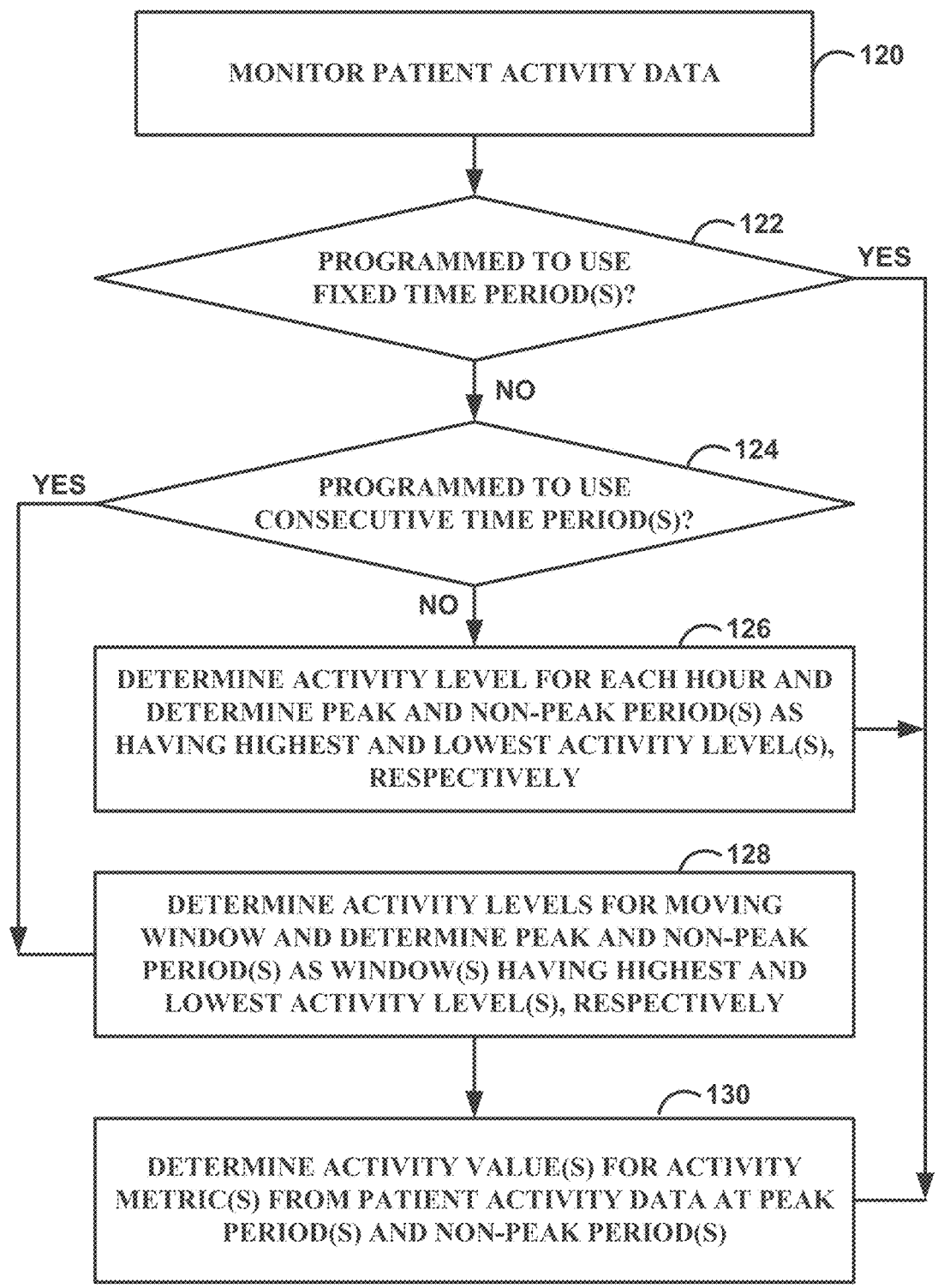
FIG. 6 is a flow diagram illustrating an example operation for determining peak and non-peak periods to enable accurate detection of changes in patient health, in accordance with one or more examples of the present disclosure.

FIG. 6 is a flow diagram illustrating an example operation for determining peak and non-peak periods to enable accurate detection of changes in patient health, in accordance with one or more examples of the present disclosure. According to the illustrated example of FIG. 6, processing circuitry 50 of IMD 10 monitors patient activity data generated by sensing circuitry 52 of IMD 10 (120). For example, as discussed in greater detail with respect to FIGS. 1-2, processing circuitry 50 may monitor the patient activity data over a number of days and initiates, each day, a method to identify peak and non-peak periods of the patient activity data for computing that day's activity metric value(s).

In the example operation of FIG. 6, it is noted that there is a range of pre-determined options that may be programmed into examples of IMD 10: A number of time periods in a day (e.g., 24 hour time periods), a length of each peak and non-peak time periods, a total amount of time of each peak and non-peak time periods a number of peak/non-peak time periods, a Boolean indicating whether or not the peak time periods are required to be consecutive (e.g., contiguous or adjacent to each other in time order) time periods, a selection of a statistical process to apply, a selection regarding which category of patient health to detect, and/or the like.

In the illustrated example, processing circuitry 50 of IMD 10 determines whether IMD 10 is programmed to use fixed time periods for computing daily activity metric values (122). By "fixed", each time period may be pre-determined and/or arbitrary (e.g., selected at random). The fixed time period(s) may be any time period(s) in a 24-hour day and only by coincidence and not by design, may be peak and/or non-peak time periods. Based on determining that IMD 10 is programmed to use fixed time periods (YES of 122), processing circuitry 50 of IMD 10 proceeds to use patient activity data corresponding to the fixed time period(s) to compute daily activity metric values for one or more activity metrics.

Based on determining that IMD 10 is not programmed to use fixed time periods (NO of 122), processing circuitry 50 of IMD 10 proceeds to determination as to whether IMD 10 is programmed to use multiple consecutive time periods for the peak and non-peak periods (124). Based upon the individual patient and/or circumstances of the patient's health, having two or more consecutive time periods as the peak periods (e.g., instead of two or more non-consecutive (e.g., non-contiguous) ones) provides a more accurate assessment of the patient's health. There may be alternative definitions of peak and non-peak periods to consider, such as having only one time period as the peak period and (possibly) only one time period as the non-peak period. Each time period may be one hour in length or multiple hours in length.

Based on determining that IMD 10 is not programmed to use consecutive time periods (NO branch of 124) and instead, is programmed to identify peak and non-peak period(s) at any time periods, processing circuitry 50 of IMD 10 proceeds to determine an activity level for each hour and determine peak and non-peak period(s) as having highest and lowest activity levels, respectively (126). There are number of mechanisms for determining the activity level of a time period (e.g., an hour) such as the 10sec23count method, which checks whether integrated counts of a frontal (z-axis) accelerometer reaches a 23-count threshold within each of consecutive 10-second windows. Processing circuitry 50 of IMD 10 may apply the 10sec23count method to each hour in the 24-hour day to determine a number of activity minutes (or fractional activity minutes (e.g., with a 10-second resolution)) for that hour; ultimately, after applying the method for a single day's patient activity data, processing circuitry 50 of IMD 10 selects, as a first peak period, an hour having the highest number of activity minutes and, as a first non-peak period, an hour having the lowest number of activity minutes in the same day. Processing circuitry 50 of IMD 10 may proceed to select at least one additional hour as supplemental peak period(s) and non-peak period(s). Because IMD 10 is not required to maintain consecutive time periods as peak and non-peak periods, processing circuitry 50 of IMD 10 may select, for the peak periods, four non-consecutive hours having four highest activity levels in the single day. Processing circuitry 50 of IMD 10 may further select four non-consecutive hours having four lowest activity levels as the non-peak periods. After selecting one or more hours as peak period(s) (e.g., a set of non-consecutive peak hours) and one or more other hours as non-peak period(s) (e.g., a set of non-consecutive non-peak hours), processing circuitry 50 of IMD 10 proceeds to determine a daily activity metric value for one or more activity metrics from patient activity data at peak period(s) and non-peak period(s) where two or more peak periods or two or more non-peak periods are not consecutive time periods (130).

Based on determining that IMD 10 is programmed to use consecutive time periods (YES of 124), processing circuitry 50 of IMD 10 proceeds to determine activity levels for moving windows and determine peak and non-peak period(s) as having highest and lowest activity levels, respectively (128). Other than a requirement that the peak periods be consecutive time periods, the present disclosure prescribes a flexible definition of moving window as including two or more consecutive time periods, such a four-hour window where each hour is one time period. As the moving window traverses the 24-hour time span, advancing by one hour at a time, processing circuitry 50 of IMD 10 applies the 10sec23count method to compute a number of activity minutes for each hour and then, combine the computed numbers of activity minutes for the two or more consecutive hours of the moving window. In one example where the moving window is a four-hour window, processing circuitry 50 of IMD 10 computes an average activity level for each moving window and then, selects the four-hour window having highest average activity level and the four-hour window having lowest average activity level. Upon determining peak and non-peak periods as two moving windows of which one corresponds to highest activity level and lowest activity levels, processing circuitry 50 of IMD 10 proceeds to determine daily activity metric value(s) for activity metrics(s) from patient activity data at peak and non-peak period(s) where both the peak period moving window and non-peak moving window include consecutive time periods (130). In some examples, processing circuitry 50 of IMD 10 determines peak and non-peak period(s) that are well-defined only after monitoring patient activity over a sufficient number of days.

Figure 7:
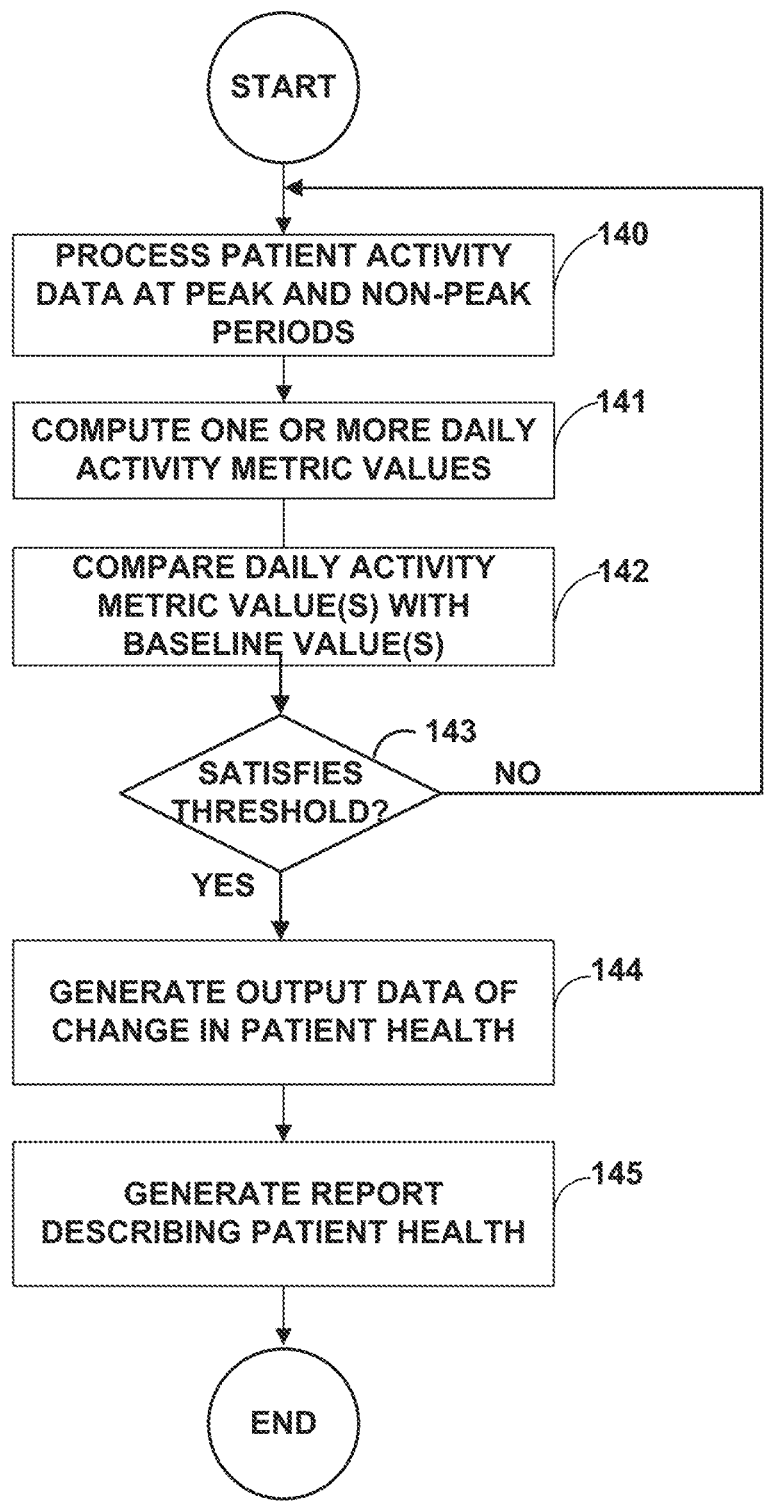
FIG. 7 is a flow diagram illustrating an example operation for detecting a change in patient health by an analysis of daily activity metric values, in accordance with one or more examples of the present disclosure.

Further detail regarding the determination of one or more daily activity metric values is provided herein for FIG. 7, which may follow the example operation illustrated in FIG. 6, by leveraging the determined peak and non-peak periods to compute a daily activity metric value and determine whether that daily activity metric value correlates with a change (e.g., a decline) in patient health. It should be noted that while some changes in daily activity metric values over a short period of time may correlate with a change in overall patient health, other changes (e.g., fluctuations) in daily activity metric values may correlated with a change in a specific category of patient health (e.g., heart health).

FIG. 7 is a flow diagram illustrating an example operation for detecting a change in patient health based upon an analysis of peak and non-peak patient activity data, in accordance with one or more examples of the present disclosure. According to the illustrated example of FIG. 6, processing circuitry 50 of IMD 10 determines one or more peak and one or more non-peak periods of patient activity data generated by sensing circuitry 52 of IMD 10. According to the illustrated example of FIG. 7, processing circuitry 50 of IMD 10 detects changes in patient health based on daily activity metric values that are computed from peak and non-peak patient activity data generated by sensing circuitry 52 of IMD 10.

In the illustrated example of FIG. 7, processing circuitry 50 of IMD 10 leverages the one or more peak periods and the one or more non-peak periods to focus a detection analysis on accurate patient activity data for detecting changes in patient health. At least the one or more peak periods correspond to highly accurate patient activity data; when combined with patient activity data associated with the one or more non-peak periods, a very accurate activity value may be computed as an example abstraction of an entire day's patient activity data. Depending upon which activity metrics processing circuitry 50 of IMD 10 employs for the computation, the daily activity metric value also provides certain insights into the entire day's patient activity data. An example activity metric may refer to mathematical functions (e.g., formulas), data structures (e.g., models), standardized methods/mechanisms, and measurements and other data configured to enable the computation of the daily activity metric value by way of analyzing the peak and non-peak patient activity data. Such an analysis may be qualitative and/or quantitative, for example, to gain insight into the patient's health by expressing as many related features as possible given the context of patient activity.

To commence such a detection analysis in the example operation of FIG. 7, processing circuitry 50 of IMD 10 processes patient activity data at the one or more peak periods and the one or more non-peak periods (140). Each day provides patient activity data from implementing one or more sensors configured to sense patient activity in some form. That patient activity data may be partitioned into periods (e.g., 24 one-hour periods) and an activity level may be determined for each time period. The present disclosure describes a number of mechanisms for determining an activity level in a particular time period. In additional to activity levels and/or a number of activity minutes per hour, each peak or non-peak period may be associated with other patient activity data.

IMD 10 may be programed with at least one peak and non-peak period determination mechanisms, examples of which include: 1) Fixed 4-hour time windows, 2) Individualized 4-hour time windows, and 3) All hourly activity windows. Each option identifies which hourly activity measurement to use for a peak or non-peak period. For example, for fixed 4-hour time windows, the medical device computes a daily activity average during a first pre-determined 4 hour time window and a night daily average during a second pre-determined 4 hour time window. Both first and second pre-determined 4 hour time window are selected by computing the hourly activity average for a moving four hour window and then, identifying the 4 hour time windows with the highest and lowest activity averages across the entire group of patients. Individualized 4-hour time windows takes into account differences in personalized habits by identifying, for each patient, time windows that have that patient's highest and lowest activity averages. All hourly activity windows are an option where an one hour moving window is used to identify one or more hour windows to use for baseline activity averages. These approaches may be hybridized; for example, one hybrid option may be to use any four hours of highest activity (e.g., four discontinuous hours) and any four hours of lowest activity for the highest and lowest activity averages, respectively.

For example, as discussed in greater detail with respect to FIGS. 1-2 and 6, processing circuitry 50 may determine that the peak period or periods are time period(s) typically having highest activity level(s) and the non-peak period or periods are time period(s) typically having lowest activity level(s). By relying upon these time periods (and possibly disregarding other time periods), the techniques described herein enable a highly accurate assessment of patient health of which acute changes are easily detected. Daily activity metric values computed from peak and non-peak patient activity data will provide the overall activity for trending and long-term analysis. An abrupt increase or decrease in sleep restlessness or an abrupt decrease in daytime activity could indicate an acute change in health.

Processing circuitry 50 of IMD 10 computes at least one daily activity metric value from the peak and non-peak activity levels and other patient activity data (141). In some examples, processing circuitry 50 of IMD 10 computes a daily activity metric value for one or more activity metrics over a single day (e.g., a current day) of the patient activity data. Each activity metric as described herein may be configured to quantify some aspect of patient activity, such that combining one or more metrics may provide a holistic view or assessment of patient health.

After computing the daily activity metric value, processing circuitry 50 of IMD 10 compares the daily activity metric value with a baseline value (142). In some examples, the baseline value may be another (e.g., previous) daily activity metric value representing a highest or average activity metric/level of daily patient activity. Hence, processing circuitry 50 of IMD 10 may compare the computed daily activity metric value with other daily activity metric values and then, use the comparison results to detect changes in patient health. In other examples, the baseline value may be pre-determined or, as an alternative, computed through other means than the one or more activity metrics while retaining a same data model to facilitate a comparison with daily activity metric values. In some examples, the baseline value represents normal health for that specific patient and any deviation from that baseline value should be evaluated. The baseline value may represent a patient's border in that the baseline value is the highest activity value/level while still indicating no decline in that patient's health; any deviation beyond the baseline value may indicate an acute change or decline in the patient's health.

Activity metrics as described herein include any number of formulas, methods, and mechanisms for determining the daily activity metric value from patient activity data. Processing circuitry 50 of IMD 10 may apply one or more activity metrics to each day's peak and non-peak patient activity data and computes the daily activity metric values for a number of days. Over time, the example daily activity metric values may form a range and that range corresponds to a baseline representing normal patient health. Deviations from the range that are either statistically significant or exceed a pre-determined threshold indicate a change in patient health.

One example peak (e.g., daytime) activity metric is the average activity of the four highest activity hours during the last 24 hours. One example non-peak activity metric (e.g., for night sleep restlessness (sleep quality)) is the average of the four lowest activity hours during the last 24 hours.

Other example activity metrics may employ different peak/non-peak period selection mechanisms, different formulas, and/or the like. For instance, the above example activity metric may be modified to permit non-consecutive one-hour time periods. Some activity metrics are configured to exploit features corresponding to overall patient health. Other activity metrics may be configured with a more granular feature set to identify changes in different categories of patient health such as heart health.

In some examples, after comparing the daily activity metric values with the baseline value, processing circuitry 50 of IMD 10 determines whether the comparison satisfies a threshold (143). In some examples, the baseline value may be pre-determined value or one of the daily activity metric values. If a difference/deviation between the computed daily activity metric value and the baseline value does not exceed the threshold (NO of 143), processing circuitry 50 of IMD 10 returns to process patient activity data at peak and non-peak periods for a different day (140). If a difference/deviation between the computed daily activity metric value and the baseline value exceeds the threshold (YES Of 143), processing circuitry 50 of IMD 10 proceeds to generate output data indicating a change in patient health (144).

As one example of the output data, processing circuitry 50 of IMD 10 may combine both metrics for trending and analysis. The daily activity metric values may be graphed over time to visually see changes and trends. A linear regression line could be displayed for the last 2 weeks to show the general trend. An alert could be provided for an acute decrease in daytime activity or acute change in sleep restlessness using Statistical Process Control (SPC). An alert would indicate a significant decline in health that would need to have further evaluation, which could involve taking a temperature, measuring oxygen, and asking about symptoms from a caregiver or clinician. This and other medical measurements would be used to determine specific causes (e.g. flu, depression).

As a response to detecting the deviation that exceeds the threshold, processing circuitry 50 of IMD 10 may proceed to generate a report describing the patient's health over time (145). IMD 10 may leverage a remote computing device such as external device 12 for additional processing power to generate the report. IMD 10 may provide external device 12 with the patient activity data over a sufficient number of days (e.g., an experiment period). In turn, processing circuitry 80 of external device 12 may generate the report to include a graph plotting the daily activity metrics over a sufficient number of days (e.g., an experiment period). Processing circuitry 80 of external device 12 may apply to the patient activity data different peak and non-peak period determination mechanisms and/or different activity metrics for comparison. If IMD 10 is programmed to use fixed 4-hour time windows, remote computing device may generate graphs plotting the daily activity metrics if individualized 4-hour time windows and all hourly activity windows mechanisms are applied. In this manner, the effectiveness of each determination mechanism may be assessed. Each mechanism may be applied to an individual or may be group-based.

The report may describe results from applying different activity metrics as well as different peak/non-peak periods. An example report may display several days of patient activity data where each day's patient activity data is partitioned into hour-long time periods. The example report may indicate which of the hour-long time periods are peak periods and which are non-peak periods; especially when different selection methods are applied, the example report may differentiate the peak/non-peak periods determined by these selection methods. For example, the example report may indicate as having a highest activity level and a lowest activity over at least one day: 1) non-contiguous peak periods and non-peak periods, 2) windows of adjacent or consecutive peak periods and non-peak periods; or 3) fixed peak periods and non-peak periods.

The order and flow of the operation illustrated in FIGS. 6 and 7 are examples. In other examples according to this disclosure, more or fewer thresholds may be considered. Further, in some examples, processing circuitry may perform or not perform the methods of FIG. 6 and FIG. 7, or any of the techniques described herein, as directed by a user, e.g., via external device 12 or computing devices 100. For example, a patient, clinician, or other user may turn on or off functionality for identifying changes in patient health (e.g., using Wi-Fi or cellular services) or locally (e.g., using an application provided on a patient's cellular phone or using a medical device programmer).

The techniques described in this disclosure may be implemented, at least in part, in hardware, software, firmware, or any combination thereof. For example, various aspects of the techniques may be implemented within one or more microprocessors, DSPs, ASICs, FPGAs, or any other equivalent integrated or discrete logic QRS circuitry, as well as any combinations of such components, embodied in external devices, such as physician or patient programmers, stimulators, or other devices. The terms "processor" and "processing circuitry" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as RAM, DRAM, SRAM, magnetic discs, optical discs, flash memories, or forms of EPROM or EEPROM. The instructions may be executed to support one or more aspects of the functionality described in this disclosure.

In addition, in some aspects, the functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements. The techniques of this disclosure may be implemented in a wide variety of devices or apparatuses, including an IMD, an external programmer, a combination of an IMD and external programmer, an integrated circuit (IC) or a set of ICs, and/or discrete electrical circuitry, residing in an IMD and/or external programmer.

What is claimed is:

1. A medical system comprising:
    a medical device comprising:
        one or more sensors configured to continuously sense patient activity; and
        sensing circuitry configured to provide patient activity data based on the continuously sensed patient activity,
        wherein the medical device comprises at least one of an implantable medical device, a pacemaker/defibrillator, or a ventricular assist device (VAD); and
    processing circuitry configured to:
        for each of a plurality of days:
            determine an activity level for each of a plurality of periods during the day based on the activity data;
            determine one or more peak periods and one or more non-peak periods from the plurality of periods based on the activity levels, the one or more peak periods and the one or more non-peak periods corresponding to one or more highest activity levels and one or more lowest activity levels, respectively;
            determine a weighted average of a parameter of the determined one or more peak periods;
            determine a weighted average of a parameter of the determined one or more non-peak periods; and
            determine a daily value for an activity metric of one or more activity metrics from the patient activity data based on the weighted average of the parameter of the determined one or more peak periods and the weighted average of the parameter of the determined one or more non-peak periods,
    wherein the processing circuitry is further configured to:
        detect a change in patient cardiac health based upon a comparison between the daily values of the activity metric of the one or more activity metrics for at least some of the plurality of days; and
        generate for display output indicating the detection of the change in patient cardiac health.

2. The medical system of claim 1, wherein the medical device comprises the implantable medical device.

3. The medical system of claim 1, wherein the processing circuitry is configured to detect a decline in patient cardiac health based on the comparison between the daily values of the activity metric of the one or more activity metrics.

4. The medical system of claim 1, wherein, to detect the change in patient cardiac health, the processing circuitry is configured to:
    determine a baseline value of the activity metric of the one or more activity metrics based on a first one or more of the daily values for the activity metric; and
    determine whether a second one or more of the daily values for the activity metric deviate from the baseline.

5. The medical system of claim 1, wherein the processing circuitry is configured to determine the one or more peak periods and the one or more non-peak periods based on activity levels in a moving window comprising a plurality of consecutive periods.

6. The medical system of claim 1, wherein the one or more peak periods are non-contiguous periods, and the one or more non-peak periods are non-contiguous periods.

7. The medical system of claim 1, wherein the one or more sensors comprise one or more accelerometers.

8. The medical system of claim 1, wherein the activity level for each of the periods comprises an amount of time that patient activity satisfied a threshold.

9. A method for controlling operation of processing circuitry of a computing device comprising, for each of a plurality of days:
 determining, using the processing circuitry of the computing device, an activity level for each of a plurality of periods during the day based on activity data from a medical device comprising one or more sensors configured to continuously sense patient activity, the medical device comprising at least one of an implantable medical device, a pacemaker/defibrillator, or a ventricular assist device (VAD);
 determining, using the processing circuitry of the computing device, one or more peak periods and one or more non-peak periods from the plurality of periods based on the activity levels, the one or more peak periods and the one or more non-peak periods corresponding to one or more highest activity levels and one or more lowest activity levels, respectively;
 determining, using the processing circuitry of the computing device, a weighted average of a parameter of the determined one or more peak periods;
 determining, using the processing circuitry of the computing device, a weighted average of a parameter of the determined one or more non-peak periods; and
 determining, using the processing circuitry of the computing device, a daily value for an activity metric of one or more activity metrics from the patient activity data based on the weighted average of the parameter of the determined one or more peak periods and the weighted average of the parameter of the determined one or more non-peak periods,
 the method further comprising:
 detecting, using the processing circuitry of the computing device, a change in patient cardiac health based upon a comparison between the daily values of the activity metric of the one or more activity metrics for at least some of the plurality of days; and
 generating, using the processing circuitry of the computing device, for display output indicating the detection of the change in patient cardiac health.

10. The method of claim 9, wherein detecting the change in patient cardiac health further comprises detecting a decline in patient cardiac health based on the comparison between the daily values of the activity metric of one or more activity metrics.

11. The method of claim 9, wherein detecting the change in patient cardiac health further comprises:
 determining, using the processing circuitry of the computing device, a baseline value of the activity metric of the one or more activity metrics based on a first one or more of the daily values for the activity metric; and
 determining, using the processing circuitry of the computing device, whether a second one or more of the daily values for the activity metric deviate from the baseline.

12. The method of claim 9, wherein detecting the change in patient cardiac health further comprises determining the peak period and the non-peak period based on activity levels in a moving window comprising a plurality of consecutive periods.

13. The method of claim 9, wherein the one or more peak periods are non-contiguous periods, and the one or more non-peak periods are non-contiguous periods.

14. The method of claim 9, wherein the activity level for each of the periods comprises an amount of time that patient activity satisfied a threshold.

15. A non-transitory computer-readable storage medium comprising program instructions that, when executed by processing circuitry of a medical system, cause the processing circuitry to:
 for each of a plurality of days:
  determine an activity level for each of a plurality of periods during the day based on activity data from a medical device comprising one or more sensors configured to continuously sense patient activity, the medical device comprising at least one of an implantable medical device, a pacemaker/defibrillator, or a ventricular assist device (VAD),
  determine one or more peak periods and one or more non-peak periods from the plurality of periods based on the activity levels, the one or more peak periods and the one or more non-peak periods corresponding to one or more highest activity levels and one or more lowest activity levels, respectively,
  determine a weighted average of a parameter of the determined one or more peak periods,
  determine a weighted average of a parameter of the determined one or more non-peak periods, and
  determine a daily value for an activity metric of one or more activity metrics from the patient activity data based on the weighted average of the parameter of the determined one or more peak periods and the weighted average of the parameter of the determined one or more non-peak periods;
 detect a change in patient cardiac health based upon a comparison between the daily values of the activity metric of the one or more daily activity metrics for at least some of the plurality of days; and
 generate for display output indicating the detection of the change in patient cardiac health.

16. The non-transitory computer-readable storage medium of claim 15, wherein the instructions that cause the processing circuitry to detect the change in patient cardiac health further comprise instructions that cause the processing circuitry to:
 determine a baseline value of the activity metric of the one or more activity metrics based on a first one or more of the daily values for the activity metric; and
 determine whether a second one or more of the daily values for the activity metric deviate from the baseline.

* * * * *